United States Patent [19]

Sato et al.

[11] Patent Number: 6,108,638
[45] Date of Patent: *Aug. 22, 2000

[54] DATA PROCESSING SYSTEM AND DATA PROCESSING METHOD USING SAME

[75] Inventors: Miyuki Sato; Kunihiko Hakamazuka; Shigeki Enoki, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/164,800

[22] Filed: Dec. 10, 1993

[30] Foreign Application Priority Data

Dec. 11, 1992 [JP] Japan ................................. 4-330820

[51] Int. Cl.[7] .................................................. G06F 17/60
[52] U.S. Cl. ................................. 705/21; 235/383
[58] Field of Search ......................... 364/405; 235/383; 395/216, 220, 221, 224, 225; 705/16, 20, 21, 24, 25

[56] References Cited

U.S. PATENT DOCUMENTS

| | | |
|---|---|---|
| 4,713,760 | 12/1987 | Yamada et al. .......................... 364/405 |
| 4,841,442 | 6/1989 | Hosoyama . |
| 4,893,237 | 1/1990 | Unno ....................................... 364/405 |
| 4,941,090 | 7/1990 | McCarthy . |
| 5,031,098 | 7/1991 | Miller et al. ............................ 364/405 |
| 5,083,638 | 1/1992 | Schneider . |
| 5,168,961 | 12/1992 | Schneider . |

FOREIGN PATENT DOCUMENTS

| | | |
|---|---|---|
| 56-2059 | 1/1981 | Japan . |
| 4-293198 | 10/1992 | Japan . |
| 2 161 631 | 1/1986 | United Kingdom . |
| 2 259 597 | 3/1993 | United Kingdom . |

OTHER PUBLICATIONS

Computer Decisions, Jun. 30, 1986, Conlon, "Diagnostics; Key to Self–Sufficiency", pp. 50–51.

Primary Examiner—Robert A. Weinhardt
Attorney, Agent, or Firm—Staas & Halsey LLP

[57] ABSTRACT

A data processing system and a data processing method using data processing system which comprises a plurality of input units for registering selected products, and a processing unit connected to the plurality of input units for calculating a total price for the selected products for each input unit, in accordance with data related to at least one of the registered selected products.

15 Claims, 9 Drawing Sheets

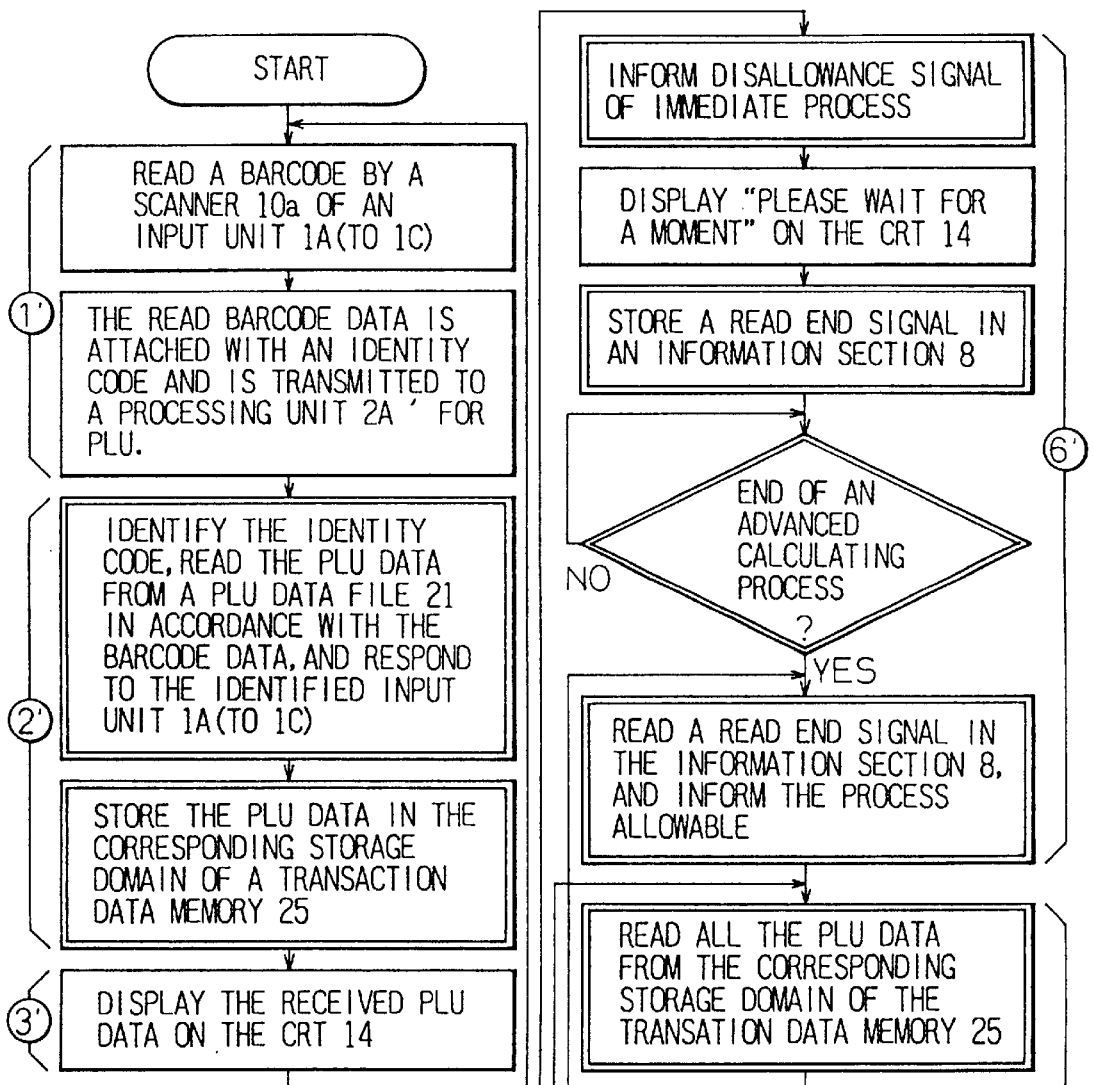

DATA PROCESSING SYSTEM AND DATA PROCESSING METHOD USING SAME

BACKGROUND OF THE INVENTION

1. Field of the Invention

The present invention relates to a data processing system and a method using the same. The system includes scanners and an electronic cash register in a POS (Point of Sales) system, and particularly relates to a data processing system wherein a customer selects and registers products, and an operator receives payment from the customer for the registered products.

2. Description of the Related Art

In a department store or a supermarket, for example, a barcode scanner and an electronic cash register are being used to register products selected by a customer, to receive a payment, and to issue a receipt. Usually, one operator registers the customer's selected products by using the barcode scanner and receives the payment in accordance with the total price displayed on the electronic cash register.

As a result, this process takes a long time for each customer and efficient registration or receipt of payment cannot be performed. When several customers form a queue, the customers must wait for a long time and thus, the quality of service provided to the customers is lowered.

In an attempt to eliminate the above situation, one operator usually operates the barcode scanner while another operator operates the electronic register during busy periods. Although this method can shorten the operation time, many operators are necessary and thus, personnel expenses are increased. Therefore, more efficient operation using fewer operators is desired.

In a POS system, a scanner and an electronic cash register are provided. When an operator passes products which have been selected by a customer across a space near a reading window of the barcode scanner, a laser beam irradiated from the reading window scans the barcode on the product and the reflected laser light is read by the scanner.

The scanner is connected to the electronic cash register by a cable. Barcode data is read and supplied to the electronic cash register. A price look up (PLU) is then performed using the barcode data in a terminal controller (T/C) and the price data is displayed on one display for the opertor and another display for the customer.

After the barcodes on all the products selected by the customer have been read, a registration end button on a keyboard is pressed. A total price is then displayed on the operator display and the customer display. The operator informs the customer of the total price, receives payment from the customer and inputs the amount of the payment using the keyboard. Then, registered details and the total price are printed on a receipt. In response, a drawer in the electronic cash register opens, and the operator removes the appropriate change, if any, and gives the change to the customer along with a receipt. Additionally, the prices for each individual product which has been registered in each transaction are summed for each type of product (the summed data is called a hard total) in the electronic cash register. As a result, the hard total for one day may be obtained and stored in a memory.

The above description is for a case where there is only one operator. When there are two operators, the electronic cash register is located facing in the opposite direction compared with the case of one operator. An operator A (one of two operators) is positioned in the same position as when there is only one operator, and an operator B (another of the two operators) is positioned facing the front of the electronic cash register.

The operator A reads the barcodes on the products using the scanner as in the case of one operator; when the barcodes of all the selected products have been read, the operator A pushes a register end button. The total price is then displayed, and the operator B receives the payment from the customer. While the operator B is receiving the payment, the operator A can begin to read the barcodes of the products selected by the next customer. Therefore, faster service can be provided for the customers.

In the conventional method with one operator, the time taken for each customer is longer so fast service cannot be provided. When there are many customers, the service is reduced even more.

With two operators, the service is improved but since two operators are required, personnel expenses are increased.

SUMMARY OF THE INVENTION

An object of the present invention is to provide a data processing system and a data processing method wherein fewer operators can operate at higher efficiency.

According to a first aspect of the present invention there is provided a data processing system comprising a plurality of input units for registering products and a processing unit connected to the plurality of input units. The processing unit executes a calculation process for each input unit, in accordance with the data of at least one product registered by at least one of the plurality of input units.

It is preferable that each input unit comprises a reader for reading a barcode on a product; a first storage for storing price data of the product corresponding to the read barcode data; a first input for inputting an indication of a completion of the read of the barcodes on all the selected products; and a communication unit for transmitting information with an appended identity code identifying the input unit, to the processing unit and for receiving data from the processing unit; and each input unit transmits the price data of the product stored in the first storage to the processing unit, after the reading of the barcodes on all the selected products is completed.

It is also preferable that the processing unit comprises an identification section for identifying the input unit, which transmits information, by an identity code attached to information transmitted from the input unit; a second storage means for storing price data of a product corresponding to the barcode data; and operation unit for performing a calculation on the price data of the products transmitted from the input unit to obtain a total price; and a response limit for responding to the input means. The processing unit reads the price data of the product corresponding to the barcode data transmitted from the input unit, from the second storage, simultaneously transmits the price data of the product to the corresponding input unit, and transmits a total price calculated by the operation unit to the input unit to which the price data of the product is transmitted.

It is also preferable that each input unit comprises a read unit for reading a barcode on a product; a first input for inputting an indication of a completion of the reading of the barcodes on all the selected products; a communication unit for transmitting information with an appended identity code identifying the input unit, to the processing unit and for receiving data from the processing unit; and the input unit informs the processing unit of the completion of reading of the barcode, and receives a calculated total price from the processing unit.

It is also preferable that the processing unit comprises an identification section for identifying the input unit, which transmits information, by an identity code attached to the information transmitted from the input unit; the second storage for storing price data of the product corresponding to the barcode data; a third storage providing a plurality of storage domains corresponding to the identity codes of the plurality of input units and for storing the price data of the product read from the second storage, in the storage domain corresponding to the identity code, in accordance with the barcode data transmitted from the input unit; an operation unit for calculating a total price from the price data of the products read from the third storage and a response unit for responding to the input units. The processing unit stores the price data of the product corresponding to the barcode data transmitted from the input unit in the third storage, and simultaneously transmits the price data of the product to the corresponding input unit; reads the price data of the product from a storage domain corresponding to the identity code in the third storage, in accordance with the information of the completion of the read of the barcodes on all the selected products from the input unit; and transmits the total price calculated by the operation unit, to the input unit which informs the processing unit of the end of the reading of the barcode.

It is also preferable that the processing unit comprises a first information unit for informing an operator of the end of reading by the corresponding input unit, in accordance with a signal indicating the end of the reading of the barcode which is transmitted from the input unit.

It is also preferable that the input unit comprises a second input means being operated by the customer and for indicating that a fault has occurred when the read unit is faulty; and that the processing unit comprises a second information unit for informing the operator of the occurrence of a fault in the corresponding input unit, when the second information unit receives an indication of the occurrence of a fault from the input unit.

It is also preferable that the plurality of input units are located side by side in a horizontal direction and the rear sides of the input units face the rear side of the processing unit.

According to a second aspect of the present invention, there is provided a data processing method using a data processing system wherein a plurality of input units are located side by side in a horizontal direction, the rear sides of the input units face the rear side of the processing unit, customers face the input units and operate the input units, and an operator faces the processing unit and operates the processing unit. The method comprises the following steps of (a) sequential reading of barcode data on products by customers using a scanner in each input unit and supplying the read barcode data adding an identity code corresponding to the input unit to the processing unit; (b) identifying the corresponding input unit by an identity code in an identification section in the processing unit upon receipt of the barcode data, reading name and price data (PLU data) of the corresponding product from a price look up data file, in accordance with the barcode data, and responding to the input unit with the read PLU data; (c) displaying the PLU data sent to the input unit, on a display and storing the PLU data in a transaction data storage; (d) repeating the above processes (a) to (c) until the reading of the barcodes on the products is completed, sending the read end signal to the processing unit in response to an operation by the customer, and storing the read end signal in an information unit in the processing unit; (e) determining whether transmission is allowed or not in accordance with the calculation state of the other input units; (f) reading all the PLU data of the products stored in the transaction data storage when the transmission allowance is informed to the input unit, transmitting the PLU data with identity code to the processing unit, and outputting a message on a display of the input unit when the transmission to the input unit is not allowable; (g) reading the read end signal and the identity code stored in the information unit, informing the transmission allowance to the input unit, clearing the message, and returning to the process (f), when an advanced calculation process ends and the transaction end signal is issued by the operator; (h) identifying the identity code, and calculating the total price of the PLU data in the operation means, when all the PLU data are received by the processing unit; (i) transmitting the total price to the input unit corresponding to the identity code, displaying the total price on the display, and receiving payment to the operator from the customer, and after that, releasing the display and storage of the read end signal in accordance with the transaction end signal from the operator; and (j) repeating the processes following process (f), when read end signals from other input units are stored in the information unit.

According to a third aspect of the present invention, there is provided a data processing method using a data processing system wherein a plurality of input units are located side by side in a horizontal direction, the rear sides of the input units face the rear side of the processing unit, customers face the input units and operate the input units, and an operator faces the processing unit and operates the processing unit. The method comprises the following steps of (a') sequential reading of barcode data on products by customers using a scanner in each input unit and supplying the read barcode data adding an identity code corresponding to the input unit, to the processing unit; (b') identifying the corresponding input by an identity code in an identification section in the processing unit upon receipt of the barcode data, reading PLU data of the corresponding product from a price look up data file, in accordance with the barcode data, and responding to the input unit with the read PLU data; (c') displaying the PLU data sent to the input unit, on a display and storing the PLU data in a transaction data storage in the processing unit; (d') repeating the above processes (a') to (c') until the reading of the barcodes on the products are completed, sending the read end signal to the processing unit by the operation of the customer, storing the read end signal in an information means in the processing unit, and then, determining whether the calculating process is being executed or not regarding the other customers' data; (e') calculating the total price in the operation means by reading all the PLU data of the products stored in the transaction data storage, and displaying all the PLU data and the total price on the display, when the process is immediately allowable in the processing unit; (f') if the process is not immediately allowable, transmitting the not immediately allowable signal to the input unit, displaying a message on the display, and storing the read end signal in the information means in the processing unit. If the calculating process of the advanced transaction is completed and the operator informs the processing unit of the transaction end signal, reading the read end signal stored in the information, informing a process allowable state to the input unit, clearing the message, and executing process step (e') in the processing unit; (g') receiving a payment to the operator from the customer when the total price is displayed, after that, releasing the display and storage of the read end signal upon receipt of the transaction end signal by the operator; and (h') continuing the process (f) and the following processes if the read end signals of other input units are stored in the information.

Other features and advantages of the invention will be apparent from the following description with reference to the accompanying drawings.

BRIEF DESCRIPTION OF THE DRAWINGS

FIG. 9A is a first flowchart showing a process of a data processing system according to the second embodiment of the invention.

DESCRIPTION OF THE PREFERRED EMBODIMENTS

Prior to the explanations of embodiments, the related art of this invention will be explained.

Figure 1:
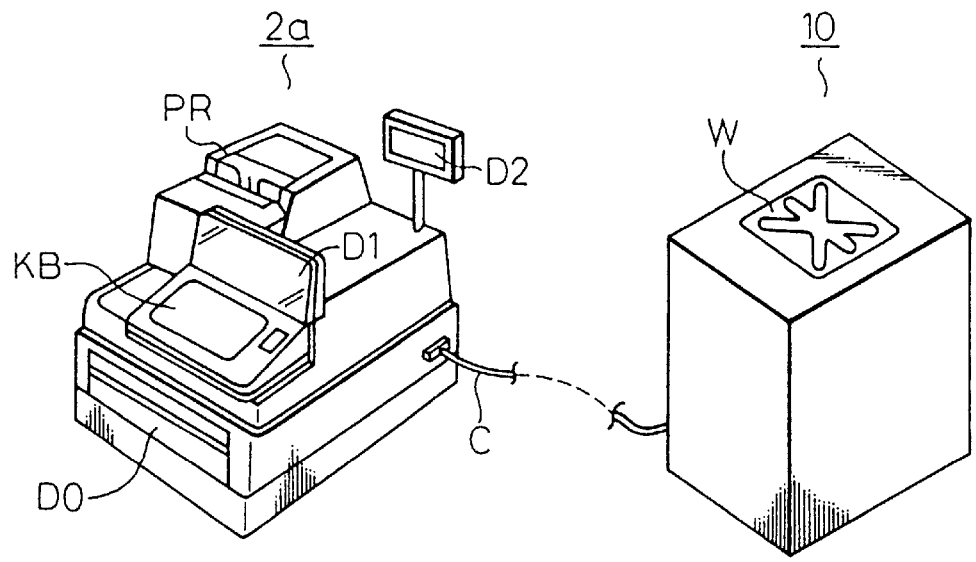
FIG. 1 is a perspective view showing a scanner and an electronic cash register used in a POS system.

In FIG. 1, a scanner and an electronic cash register used in a POS system are shown. In the figure, a reference numeral 10 is a scanner, W is a reading window in the scanner, 2a is an electronic cash register, D1 is a display for displaying a data sent in response, D2 is a display for customer, KB is a keyboard, DO is a drawer, and PR is a printer.

Figure 2A:
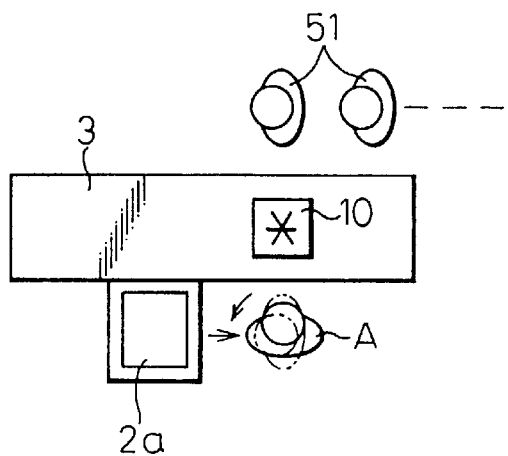
FIG. 2A is a plan view showing a location of the scanner, the electronic cash register, an operator and customers.
Figure 2B:
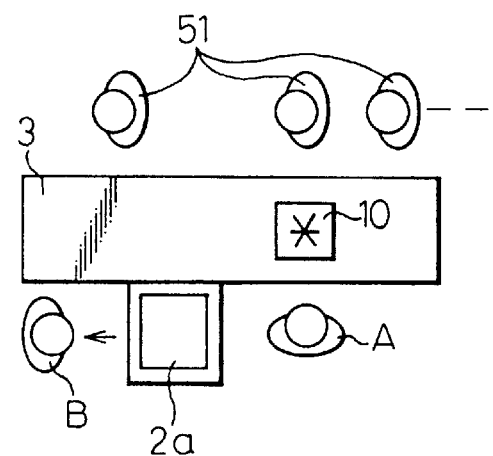
FIG. 2B is a plan view showing a location of the scanner, the electronic cash register, operators and customers.

FIG. 2A and FIG. 2B are plan views of the arrangement of the scanner and the electronic cash register in the case of one-operator operation and two-operator operation, respectively. As shown in FIG. 2A, a calculation counter 3 including the scanner 10 is located at a right angle to the electronic cash register 2a, which is located facing an operator A (straight arrow direction). In the case of two operator operation, as shown in FIG. 2B, the electronic cash register is located facing the opposite direction (arrow direction). A second operator B is positioned in front of the electronic cash register. Reference number 51 indicates customers.

Figure 3:
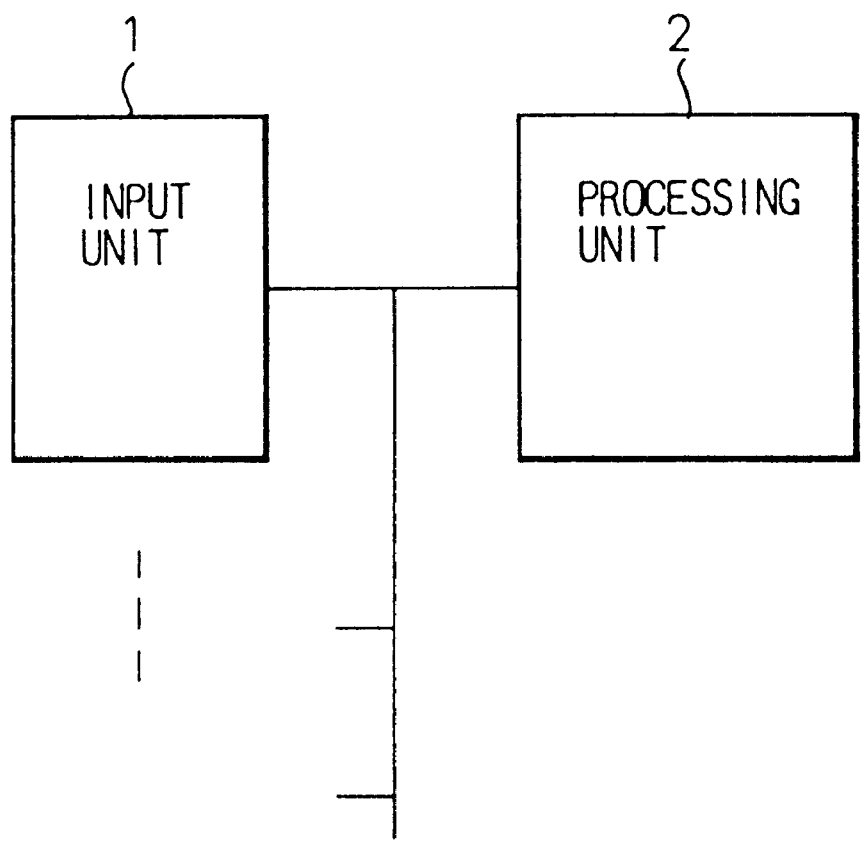
FIG. 3 is a schematic block diagram explaining the present invention.

Next, a summary of a data processing system according to the present invention is shown with reference to FIG. 3.

In FIG. 3, reference numeral 1 is one of a plurality of input units which register products; and 2 is a processing unit which is connected to the input units 1.

Accordingly, in accordance with barcode data of at least one product, input from at least one of a plurality of input units 1, a processing unit 2 executes a calculating process for corresponding input unit 1.

Price data of at least one product is input to at least one of a plurality of input units. Execution of a calculating process of a transaction price in a corresponding input unit 1 by a processing unit 2 occurs in accordance with the price data of the product. If the plurality of input units 1 register the products in parallel with the processing unit 2, the price data can be processed in order of input completion in the input units 1. Thus, a plurality of input units 1 can be controlled by one processing unit 2.

Accordingly, in each input unit, the customer operates the scanner and inputs the barcode data, and the operator can execute a calculation process for the transaction price in each input unit. Therefore, a few operators can operate the data processing system with high efficiency.

1) First Embodiment

Figure 4:
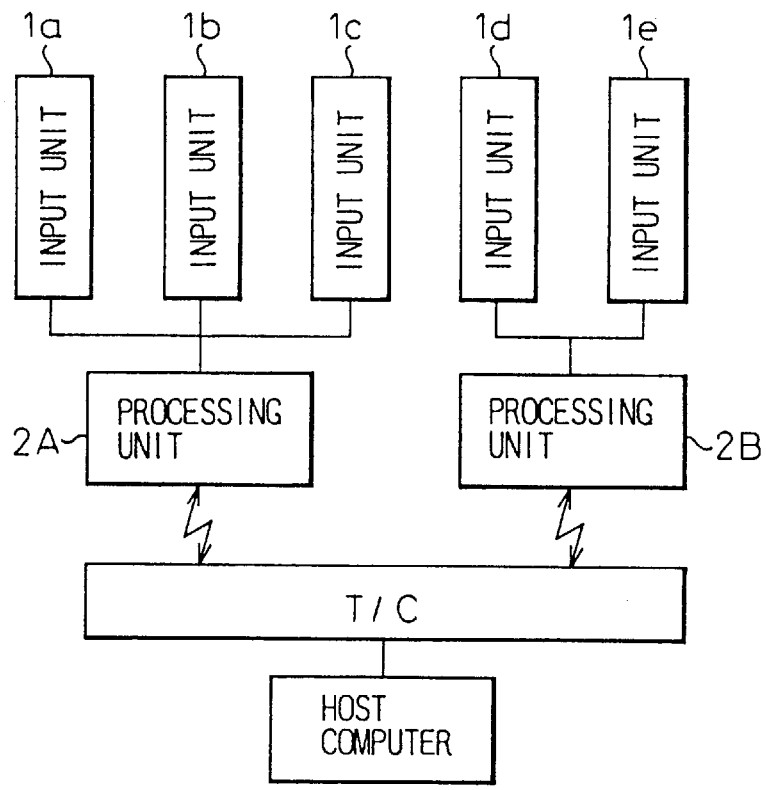
FIG. 4 is a block diagram showing a data processing system according to a first embodiment of the present invention.
Figure 5:
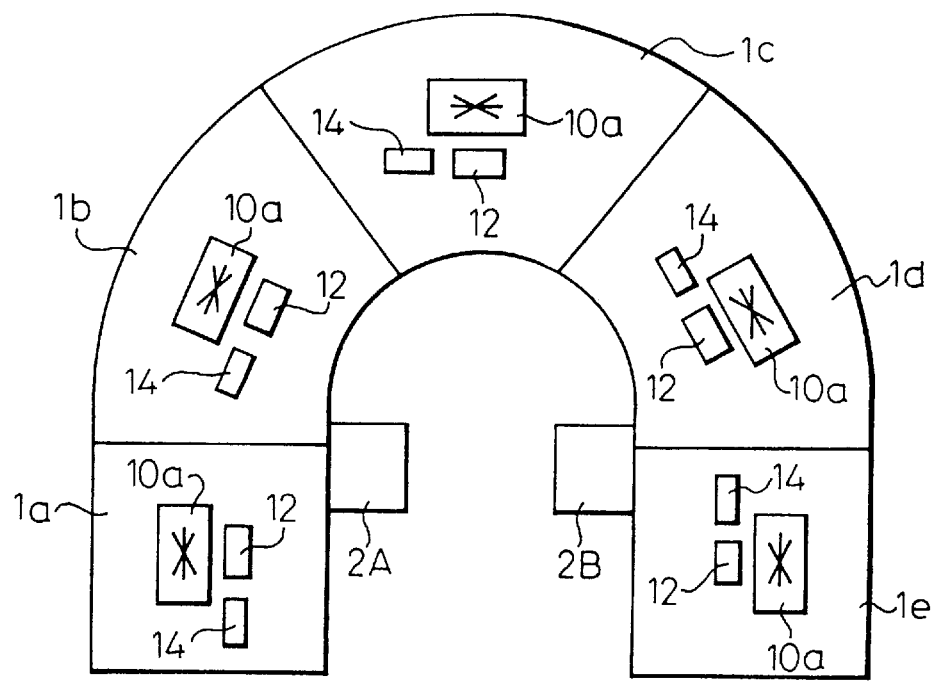
FIG. 5 is a plan view showing a location of scanners and processing units according to first and second embodiments of the invention.
Figure 6:
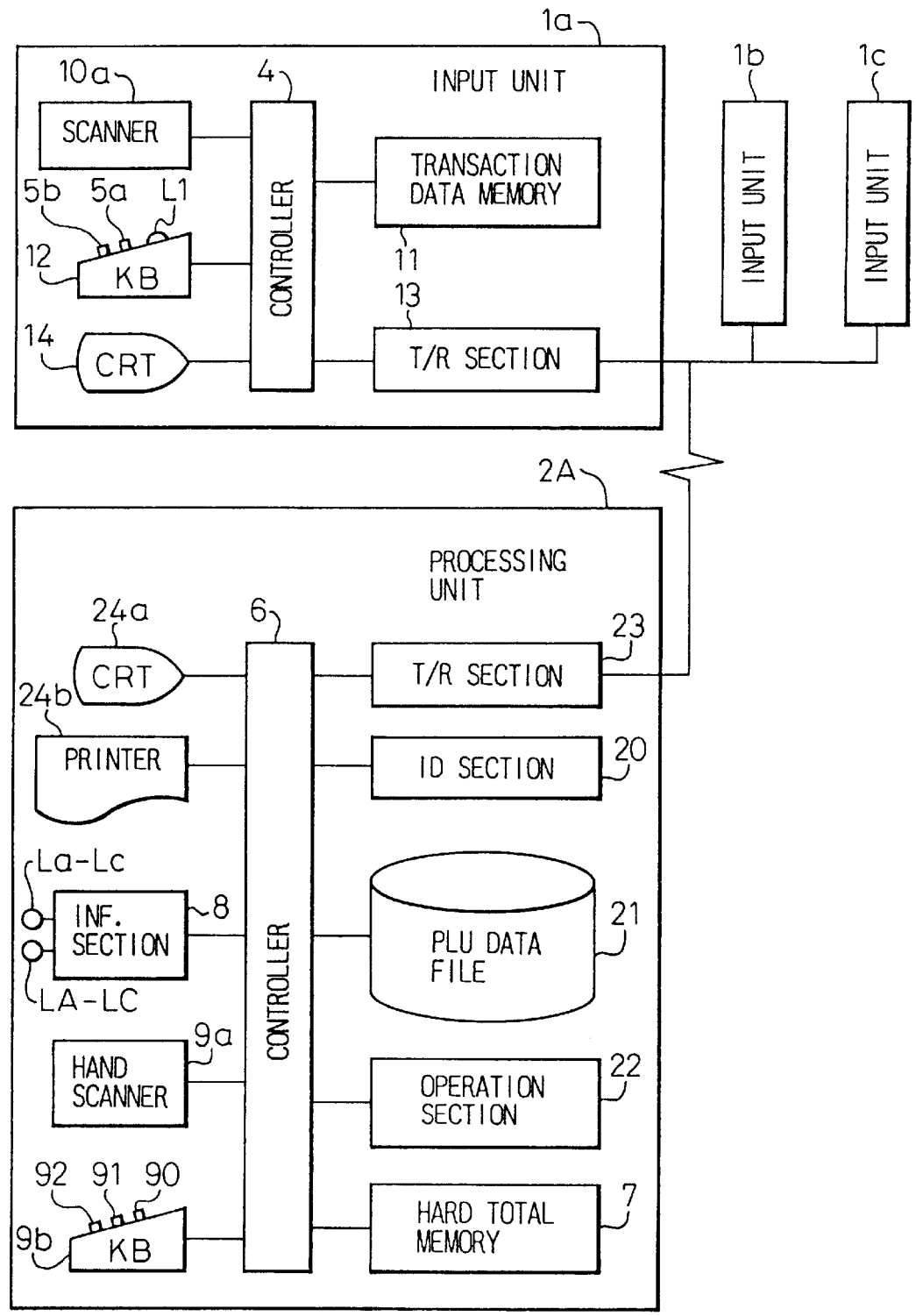
FIG. 6 is a partial block diagram showing a data processing system according to the first embodiment of the invention.

Embodiments of this invention are now explained. A first embodiment is explained with reference to FIG. 4, FIG. 5, FIG. 6, FIG. 7A, and FIG. 7B. FIG. 4 is a block diagram of a data processing system according to the first embodiment; FIG. 5 is a plan view showing a location of input units and processing units of the first embodiment; FIG. 6 is a block diagram showing the data processing system of the first embodiment; and FIGS. 7A and 7B, taken together are a flowchart of the process according to the first embodiment. In all the figures, the same reference numbers show the same objects.

As shown in FIG. 4, the input units 1a to 1c, and 1d to 1e are connected to the processing units 2A and 2B, respectively. The processing units 2A and 2B are connected to a host computer through terminal controllers (T/C's).

Further, as shown in FIG. 5, the input units 1a to 1e are located in a horseshoe fashion, with their backs facing toward the processing units, and the processing units 2A and 2B (the back sides of which face the input units 1a to 1c and 1d to 1e) are located at the inside of the horseshoe. Operators are positioned at each of the processing units 2A and 2B.

Accordingly, customers approach the front of the input units 1a to 1e, i.e. the customers are outside of the horseshoe. The customers themselves effect reading and registration of barcodes on products they wish to purchase, and after this is finished, the operator executes a calculation of the products.

The input units 1a to 1c and the processing unit 2A are now explained. As shown in FIG. 6, each input unit comprises a controller 4, a scanner 10a, a transaction data memory 11, a keyboard (KB) 12, a transmission/reception (T/R) section 13, and display (CRT) 14.

The processing unit 2A comprises a controller 6, identification (ID) section 20, PLU data file 21, operation section 22 (operation means), a transmission/reeption (T/R) section 23, a CRT 24a, a printer 24b, a hard total memory 7, an information section 8, and a hand scanner 9a, and KB9b.

In the input unit 1a, the controller 4 provides a central processing unit (CPU) and control program (not shown), and controls each section in accordance with a control program.

The scanner 10a has the same functions as the scanner 10 explained above for the related art and shown in FIG. 1. The barcode is read when the product is passed by the above read window by the customer.

The transaction data memory 11 comprises e.g., a RAM and PLU data sent from the processing unit 2A based on the barcode data read by the scanner 10a, sequentially stored by one transaction unit.

KB comprises a read 12 end key 5a pressed by the customer to indicate when the reading of the barcode on the products is finished; a call key 5b for calling the operator when reading is not possible due to a failure of the scanner 10a or loss of the barcode; and a lamp L1 which turns ON when the call key 5b is pushed.

The transmission/reception section 13 transmits or receives a signal to or from the processing unit 2A. The barcode data; the PLU data; the read end signal output when the read end key 5a, is pushed and the call signal output when the call key 5b is pushed, are transmitted with the identity code of the input unit 1a.

The CRT 14 is a display for the customer and displays the PLU data from the processing unit 2A, the total price of the PLU data in one transaction, and a message. For the display, the other types are used also.

In the processing unit 2A, the controller 6 includes the CPU and the control program (not shown) and elements in the processing unit 2A are controlled by the control program.

The identification (ID) section 20 identifies the input unit 1a to 1c, which sends the data, based on the identity code attached to a signal transmitted from the corresponding input unit 1a to 1c.

The PLU data file 21 is a memory storing the price of products corresponding to the barcode data, i.e., the PLU data file which can store the name etc. of products.

The operation section 22 calculates a total price of all the PLU data which is transmitted from the input unit 1a (to 1c) when the reading ends, and change to be returned to the customer based on the customer's payment. Further, in each transaction, a hard total is calculated using the PLU data.

The transmission/reception (T/R) section 23 executes the reception and the transmission from or to the input unit 1a (to 1c).

The CRT 24a displays the PLU data read from the PLU data file and displays the total price and change to be returned to the customer calculated by the operation section 22a.

The printer 24b sequentially prints the PLU data, which includes, for example the price of a product, the number of the products, the total price, and the change displayed on the CRT 24a, on a receipt paper.

The hard total memory 7 comprises, e.g., a RAM which stores the operation results of the hard total calculated by the operation section 22, and is supported by a backup battery when the power source is turned OFF. The hard total is transmitted to the host computer through the T/C at each transaction end or at closing time.

When an advanced transaction is executing (e.g., a calculating process using the PLU data transmitted from the input unit 1a is being carried and if a specific transaction is received (e.g., the read end signal from the input unit 1b or 1c). An information (INF) section 8 provides a memory, for storing the read end signal with an indication of order of reception attached, a plurality of green lamps, La to Lc, and a plurality of red lamps, LA to LC, corresponding to the input unit 1a to 1c. When the read end signal is received from the input unit 1a (to 1c), the corresponding green lamp La (to Lc) is turned ON, and when the call signal is received, the corresponding red lamp LA (to LC) is turned ON.

The hand scanner 9a is attached to the end of a cable (not shown). A barcode can be read by moving the hand scanner 9a. When the scanner 10a in the input unit 1a (to 1c) cannot read a barcode and the red lamp La (to Lc) is turned ON by the call key 5b, the operator is notified and then uses the hand scanner 9a to read the barcode of the product from the input unit designated by the red lamp.

When reading by the hand scanner 9a cannot be carried out, the code number corresponding to the barcode is input by the ten-key keypad 90 on the KB 9b, a calculation instruction key 91, and a transaction end key 92.

Figure 7A:
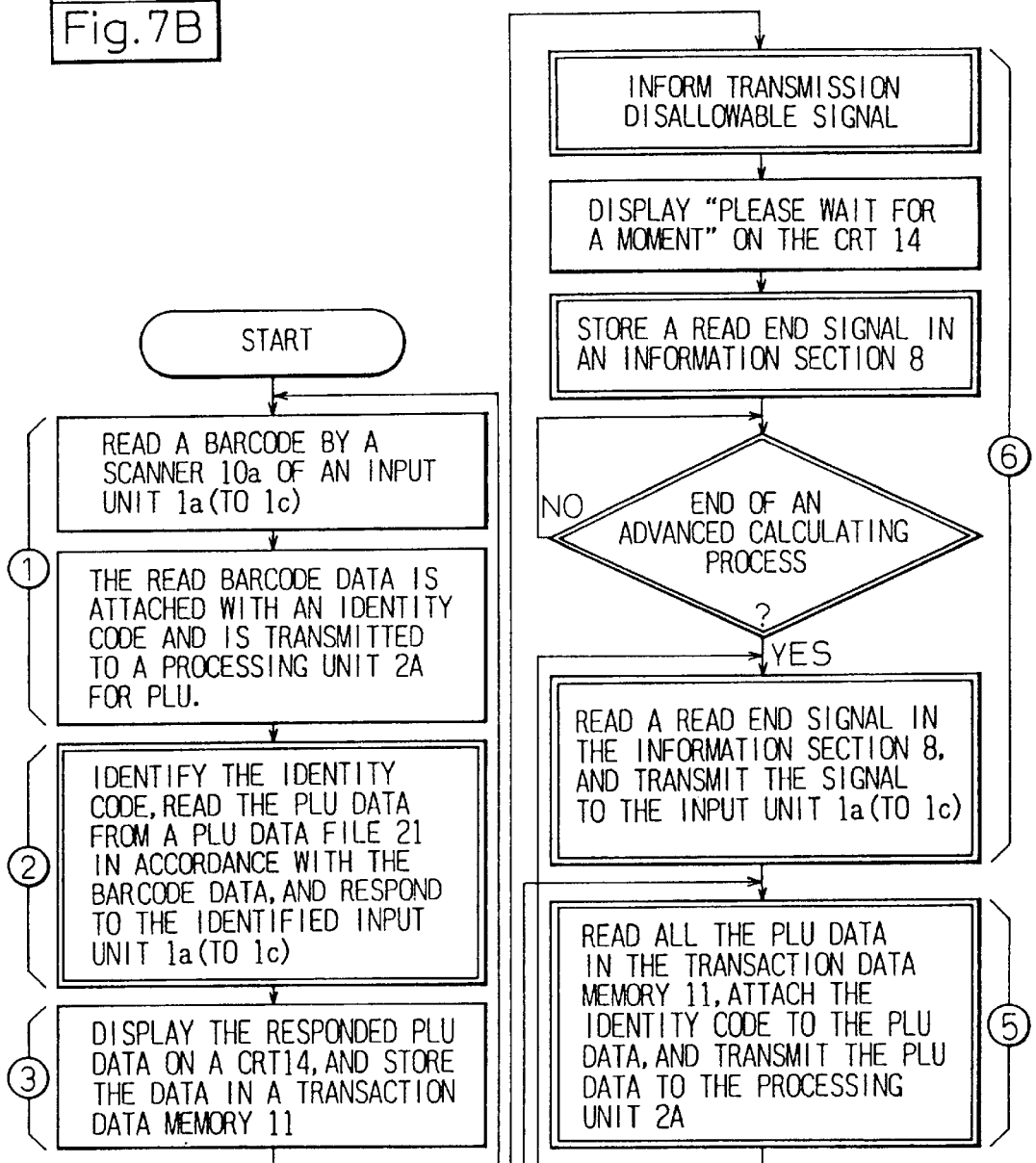
FIG. 7A is a first flowchart showing a process of a data processing system according to the first embodiment of the invention.
Figure 7B:
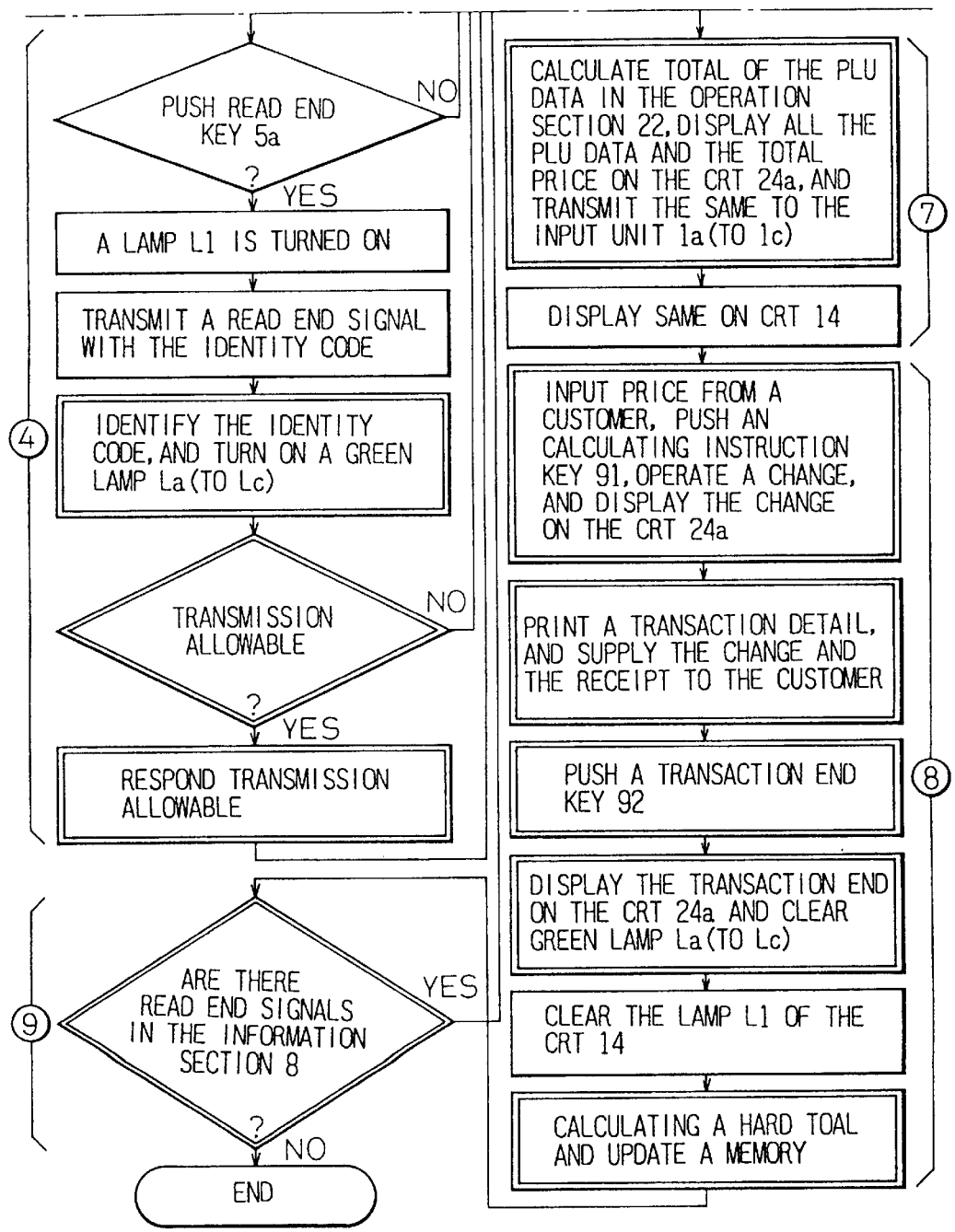
FIG. 7B is a second flowchart showing a process of a data processing system according to the first embodiment of the invention.

The operation of the above-mentioned data processing system is explained next with reference to the flowchart of FIG. 7A and FIG. 7B. In the figure a single border block shows an operation of the input unit 1a (to 1c) and a double border block shows an operation of the processing unit 2A.

In step 1 (①), the customer gathers products to be purchased in a basket, goes to the front of one of the input units 1a and to 1c (e.g., input unit 1a), has the barcodes of the products sequentially read by the scanner 10a. The identity code is attached to the read barcode data by the transmission/reception section 13, and the barcode data is transmitted to the processing unit 2A.

In step 2 (②), the processing unit 2A, upon receipt of the barcode data, identifies the corresponding input unit 1a by the identity code, in the identification section 20. The processing unit 2A then reads the PLU data of the product from the PLU data file 21 in accordance with the corresponding barcode data, and responds by sending the read PLU data, which corresponds to the identity code, to the input unit 1a by the transmission/reception section 23.

In step 3 (③), the input unit 1a displays the PLU data, which includes the price of a product and the number of the products etc., sent in response on the CRT 14, and stores the PLU data in the transaction data memory 11.

In step 4 (④), steps 1 to 3 are repeated to read the barcodes on all the products selected by the customer. When all the barcodes on the products selected by the customer are completely read the customer then pushes the read end key 5a and the lamp L1 in the input means KB12 is turned ON. Then, the read end signal with the attached identity code is transmitted to the processing unit 2A, and the green lamp La corresponding to the input unit 1a in the information section 8 is turned ON. The processing unit 2A responds by informing the transmission allowance state or disallowance state to the input unit 1A, depending on the existence or nonexistence of the calculation process in the other input units 1b and 1c.

In step 5 (⑤), when the allowable state of the transmission is informed, all the PLU data of the products stored in the transaction data memory 11 are read and the PLU data with the attached identity codes are transmitted to the processing unit 2A.

In step 6 (⑥), if the PLU data of another customer (using input unit 1b or 1c) executes the calculating process and a disallowable state is informed to the input unit 1a, the message "please wait for a moment" is displayed on the CRT 14 of input unit 1a. The processing unit 2A stores the read end signal in the information section 8 with the identification of the input unit 1a. When the calculation process of the advanced transaction is completed and the transaction end key 92 is pushed, the read end signal and the identification result, stored in the information section 8 are read. Then, the allowable state of the transmission is indicated to the input unit 1a, the message is cleared, and the process in the step 5 is carried out. At that time, the customer's waiting time is an interval from halfway through the calculation process to the time when the transaction end key 92 is pressed. Therefore, the waiting interval is very short.

In step 7 (⑦), when all the PLU data are received for the processing unit 2A from input unit 1a, the identity code is identified, the total price of the PLU data is calculated in the operation section 22, and all the PLU data and the total price are displayed on the CRT 24a with the number of the input unit 1a. The operator knows that the register operation of the products for the input unit 1a has ended by the display of the number of the input unit and the displayed total price data and all the PLU data.

The total price is transmitted to the input unit 1a corresponding to the identity code from the transmission/reception section 23 and is displayed on the CRT 14. The customer can then know the total price from the display on the CRT 14.

In step 8 (⑧), the operator tells the total price to the customer, and receives, for example, cash. The operator then inputs the received cash using the ten-key keypad 90 in the KB 9b, and pushes the calculation instruction key 91. The processing unit calculates the change and displays the amount on the CRT 24a. Then, the transaction details (i.e., all the PLU data, total price and change) are printed on the receipt paper in the printer 24b, the drawer DO (not shown) opens, the operator hands the change and the receipt to the customer, and the transaction ends. Next, if the transaction end key 92 is pushed, the display on the CRT 24a and the green lamp La are cleared and simultaneously, an indication of the end of the transaction is transmitted to the input unit 1a, and the display on the CRT 14 and the lamp L1 in the KB 12 are cleared. During the above time, the operation section 22 updates the hard total stored in the hard total memory 7 by adding new data to the PLU data.

In step 9 (⑨), if the read end signals from the other input units are stored in the information section 8, the read end signal is read and transmitted to the corresponding input unit 1a (to 1c), and the processes of the steps following the step 5 are repeated.

In step 1 of the above processes, when the customer cannot read the barcode due to a fault in the scanner 10a or loss of the barcode, if the customer pushes the call key 5b, the lamp L1 in KB12 turns ON, and simultaneously, the call signal with the identity code is transmitted to the process unit 2A. Then, in the identity section 20, the identity code is identified, the red lamp LA (in the case of the input unit 1b or 1c, red lamp LB or LC, respectively) corresponding to the input unit 1a in the information section 8 is turned ON, and the operator is called. The operator goes to the input unit 1a, and responds to the emergency. For example, if the scanner 10a is faulty, the hand scanner 9a is used, and if the loss of the barcode occurs, the ten-key keypad 90 of the KB 9b is used to input the barcode of the products.

In this case, the scanner 10a may be hand scanned. The hand scanner 9a may be an installed type. Further, each input unit may have a PLU file. In this case, it is not necessary that the input unit access the PLU file in the processing unit.

2) Second Embodiment

Figure 8:
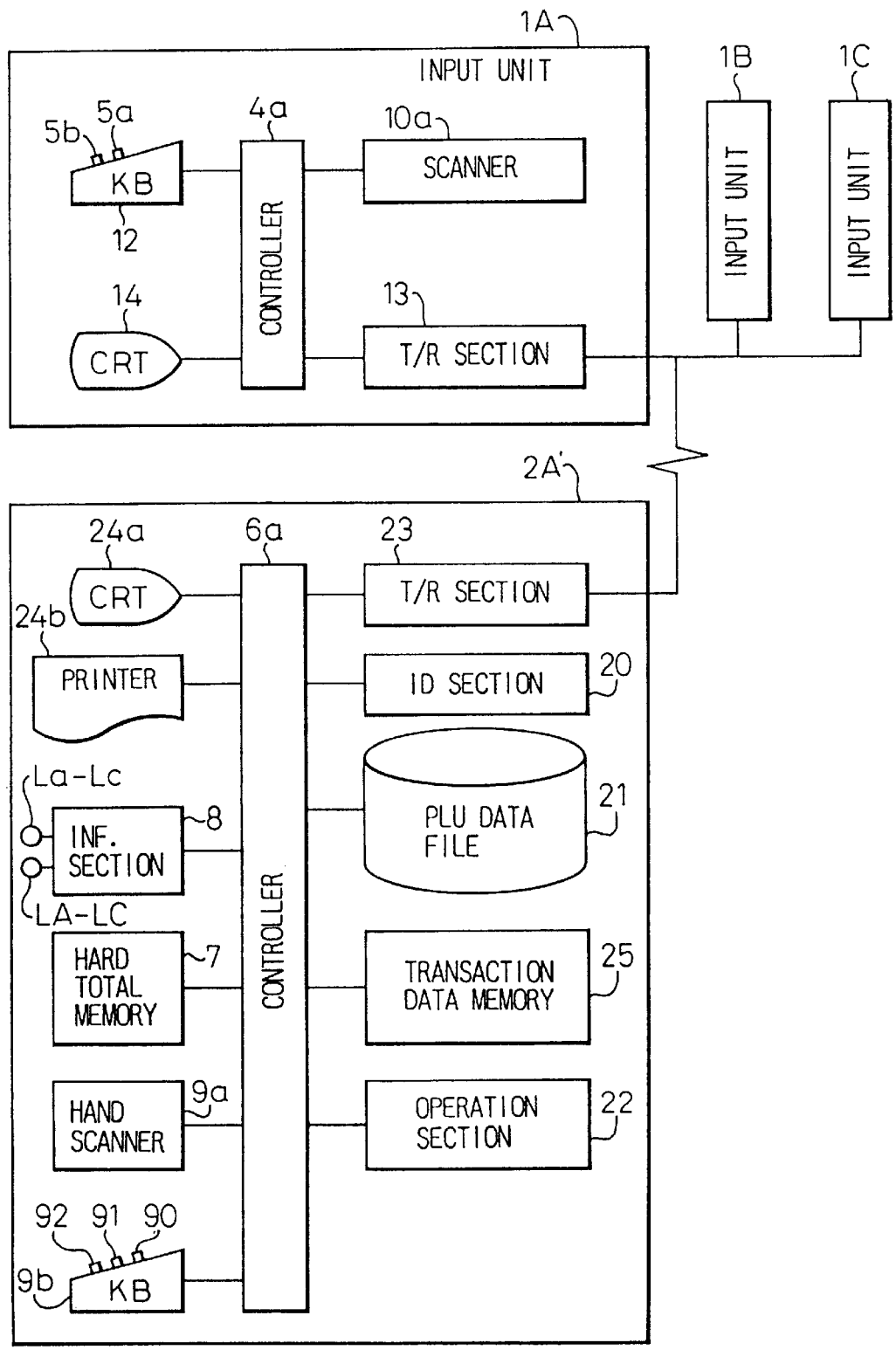
FIG. 8 is a partial block diagram showing a data processing system according to a second embodiment of the invention.
Figure 9B:
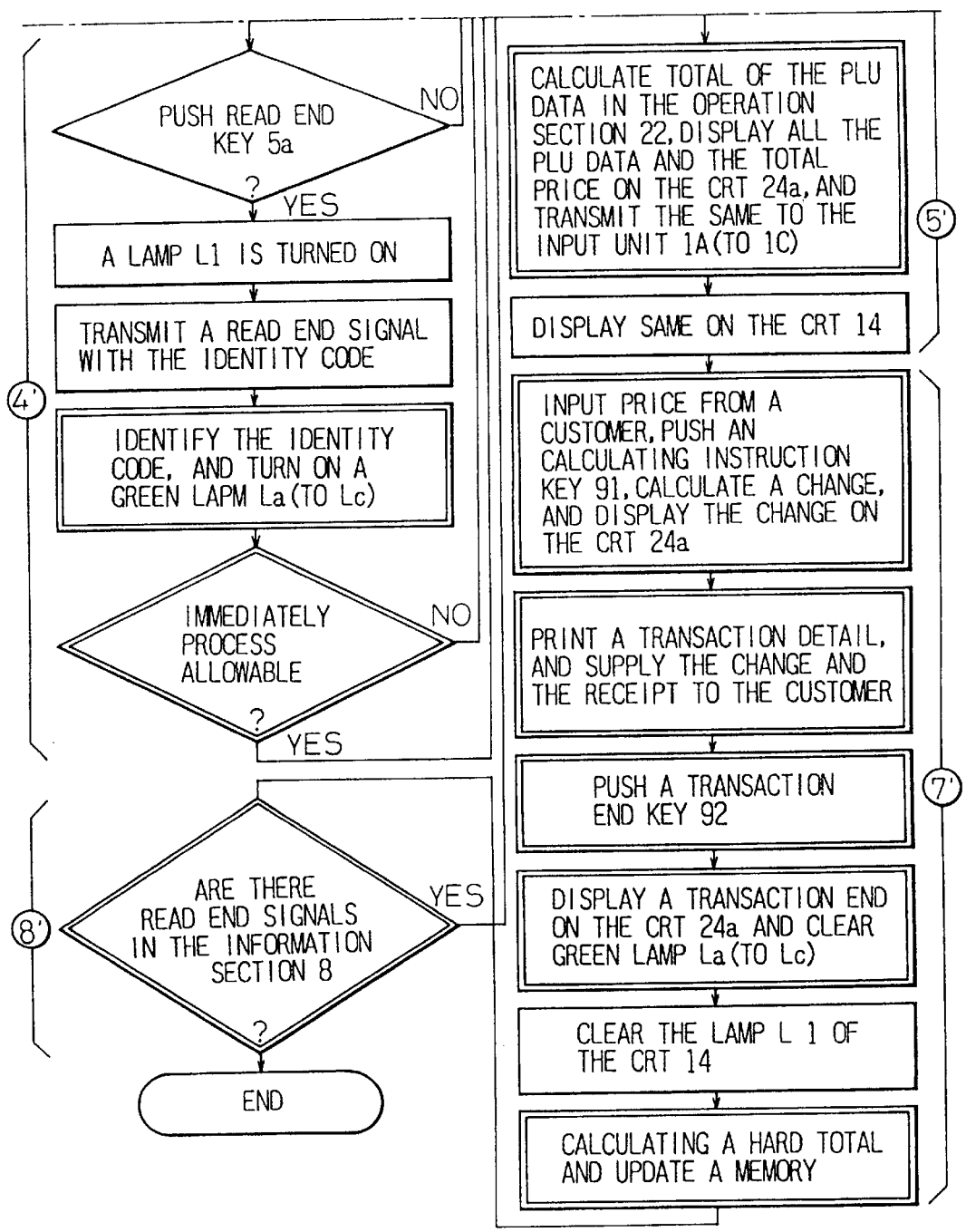
FIG. 9B is a second flowchart showing a process of a data processing system according to the second embodiment of the invention.

Next, a second embodiment according to the present invention is explained with reference to FIG. 8, FIG. 9A and FIG. 9B. FIG. 8 is a block diagram of the second embodiment and FIGS. 9A and 9B are a flowchart of the process of the second embodiment. In all figures, the same reference numerals show the same elements.

A data processing system according to the present invention comprises input units 1A to 1C, 1D and 1E (1D and 1E are not shown) and processing units 2A' and 2B' which are located the same as in the first embodiment, as shown in FIG. 5.

The difference between the first embodiment (FIG. 6) and the second embodiment (FIG. 8) is as follows. In the first embodiment, each input unit 1a (to 1c) has a transaction data memory 11, and each input unit 1a (to 1c) stores the PLU data. On the hand, in the second embodiment, the processing unit 2A' has a common transaction data memory 25, and the PLU data in each input unit 1A (to 1C) are stored in the corresponding storage domains.

As shown in FIG. 6, the input unit 1A (to 1C) comprises a controller 4a, a scanner 10a, a KB12, a transmission/reception section 13 and a CRT 14.

The processing unit 2A' comprises a controller 6a, an identification section 20, a PLU data file 21, an operation section 22, a transmission/reception section 23, a CRT 24a, a printer 24b, a transaction data memory 25, a hard total memory 7, an information section 8, a hand scanner 9a, and a KB 9b.

In the input unit 1A (to 1C), the controller 4a has a CPU (not shown) and a control program (not shown) and the control program controls each section.

In the processing unit 2A', the controller 6a has a CPU (not shown) and a control program (not shown) and the control program controls each section.

The transaction data memory 25 is, for example, disk memory, which has a plurality of storage domains corresponding to each of the input units 1A to 1C, and the PLU data corresponding to the input units 1A to 1C are stored in the storage domain corresponding to the identity codes.

Next, using the flowchart in FIGS. 9A and 9B, the operation of the system is explained. In the figures, the single outline block shows an operation of the input unit 1A (to 1C) and the double outline block shows an operation of the processing unit 2A'.

In step 1' (①'), the customer gathers products to be purchased, for example, in a basket, goes to the front of one of the input units 1A to 1C (e.g., input unit 1A), and sequentially reads the barcodes of the products using the scanner 10a. The read barcode data are attached the identity code by the transmission/reception section 13, are transmitted to the processing unit 2A'.

In step 2' (②'), the processing unit 2A', upon receipt of the barcode data, identifies the corresponding input unit 1A by the identity code, in the identification section 20, reads the PLU data of the product from the PLU data file 21 in accordance with the corresponding barcode data, and responds by sending the read PLU data to the input unit 1A, which corresponds to the identity code by the transmission/reception section 23 for display. Simultaneously, the PLU data is stored in the storage domain corresponding to the identity code of the transaction data memory 25.

In step 3' (③'), the input unit 1A displays the received PLU data on the CRT 14.

In step 4' (④'), the steps 1' to 3' are repeated by reading the barcodes for the products. When the reading of the barcodes on the products by the customer ends, the customer pushes the read end key 5a. Then the lamp L1 in the KB 12 is turned ON, the read end signal with the identity code is transmitted to the processing unit 2A', the green lamp L1 in the information section is turned ON, and it is determined whether immediate process is possible or not, i.e., another customer's data (input unit 1B or 1C) is being calculated or not.

In step 5' (⑤'), when immediate processing, in the processing unit 2A' is possible, all the PLU data of the products stored in the corresponding storage domain of the transaction data memory 25 are read. The total price is calculated in the operation section 22, and all the PLU data and the total price are displayed on the CRT 24a. On the other hand, the total price signal is transmitted to the input unit 1A corresponding to the identity code from the transmission/reception section 23 and is displayed on the CRT 14.

In step 6' (⑥'), if immediate processing is not possible, the immediate processing disallowable state is informed to the input unit 1A, and the message "please wait for a moment" is displayed on the CRT 14. In the processing unit 2A', the read end signal is stored in the information section 8, and when the advanced transaction calculation process ends and the transaction end key 92 is pushed, the read end signal stored in the information section 8 is read. Then, the processing allowable state is informed to the input unit 1A, and the message is cleared. In the processing unit 2A', the process of step 5' is carried out.

In step 7' (⑦'), when the total price is calculated, the operator tells the customer the total price, receives payment, and inputs the received amount by using the ten-key keypad of the KB 9b. Then, the calculation instruction key 91 is pushed, and the calculated change is displayed. All the PLU data, the total price, and the change, i.e., the transaction details are printed on the receipt paper by the printer 24b. The drawer D0 (not shown) opens, the operator hands the change and the receipt to the customer, and the transaction ends. Then, the transaction end key 92 is pushed, the display of the CRT 24a and the green lamp La are cleared and simultaneously, the transaction end signal is transmitted to the input unit 1A, and the display on the CRT 14 and the lamp L1 in the KB 12 are cleared. During this time, the operation section 22 is updated by adding the PLU data to the hard total in the hard total memory 7.

In step 8' (⑧'), if the read end signal from the other input unit is stored in the information section 8, the processes following step 5' are repeated.

In the above step 1' in the flowchart, when the barcode cannot be read by the scanner 10a, if the customer pushes the key 5b, the lamp L1 of the KB12 is turned ON. Simultaneously, the call signal with the identity code is transmitted to the processing unit 2A', the identity code is identified by the identification section 20, the red lamp LA in the information section 8 is turned ON, and the operator is called. The operator goes to the input unit 1A, and if the scanner 10a is faulty, uses the hand scanner 9a. If the barcode is missing, the ten-key keypad 90 in the KB 9b is used.

Thus, the registering of the products is carried out by the customer. Since the operator executes only the calculation process, a high speed processing is possible. Further, if a plurality of input units (1a to 1c, 1A to 1C) operate in parallel for registering products, the processing unit can respond with the PLU data to the corresponding input unit (1a to 1c, 1A to 1C). In this case, the respective green lamps La to Lc are turned ON by the operation of the read end key 5a, and the calculation process can be sequentially carried out in accordance with the order of the advancing processes. In the case of using the input units 1D and 1E, and the processing unit 2B, similar processing controls are carried out.

In the second embodiment, since the common transaction data memory 25 in the input units 1A to 1C is provided in the processing unit 2A', the cost of the system is lower than that of the first embodiment wherein the transaction data 11a is provided in each input unit 1a (to 1c). Moreover, since the transmission of data between the input units 1A to 1C and the processing unit 2A can be reduced, the processing time can be shortened.

Further, since the number of operators is equal to the number of processing units (2A, 2B, 2A', 2B'), personnel expenses are reduced.

In addition, as explained in FIG. 5, since the input units (1a to 1e, 1A to 1E) are arranged in a semi-circle, with the backs of the input units facing inward, and the processing units (2A, 2B; 2A', 2B') are arranged at the inner portion of the semi-circle. The operation of reading the barcode on the product performed by the customer can be watched by the operator, and the supply and reception of the cash can be easily executed.

In the above example, if the other input units are not performing a calculation process, when the customer pushes the read end key 5a after reading the barcodes on the products, the total of the PLU data corresponding to the barcode data is immediately calculated. However, if the read end key 5a is pushed, it is possible that, even if the calculating process is being carried out in another input unit, the green lamp in the processing unit can be turned ON only informing the read end, and the total of the PLU data can be calculated by the operator pushing a process start key.

In the above example, the processing unit (2A, 2B, . . . , 2A', 2B', . . . ) calculates the total PLU data, however, the input unit may execute the calculation process. Then, when the total price is calculated, the information may be transmitted to the processing unit, and the operator may execute the calculation process thereby.

In the above example, it was explained that the processing units (2A, 2A') are provided with the PLU data file 21, however, the PLU data file may be provided in the T/C.

As explained above, by using the present invention, a plurality of input units can be controlled by one processing unit. Accordingly, for example, in a POS system, the customers operate a plurality of input units and register products, while the operator executes the calculation process by using the processing unit. Thus, the transaction process is sped up, one operator is sufficient for a plurality of input units, and a few operators can operate many input units consequently, personnel expenses can be reduced. Further, by storing product price data corresponding to the barcode data read by each input unit, in the storage domain corresponding to each input unit in the third storage means of the processing unit, the system cost can be reduced compared with a system wherein each input unit is provided with the first storage means.

Further, by providing the information means for informing the read end of the barcode visually, in the processing unit, the read end of the barcode can be easily known by the input unit corresponding to the identity code.

Further, if the reading means becomes faulty, by providing a second input means for inputting an indication of the occurrence of the fault by a manual operation, in the input unit, a signal informing the fault is easily supplied to the processing unit.

Further, in the embodiments, by arranging a plurality of input units side by side in a horizontal direction with the rear sides of the input units facing to the rear side of the processing unit, the operation state of the plurality of input units can be easily supervised from the processing unit. Accordingly, in the POS system, when customers operate the plurality of input units and register products, and the operator executes the calculation process using the processing unit, the operator can clearly watch the operation performed by the customers, and can smoothly exchange cash.

What is claimed is:

1. A point-of-sales system comprising:

a processing unit operated by a store clerk, including a first input unit for registering products by reading codes on products, and a processing means for processing corresponding product data; and a plurality of second input units, connected to said processing unit and to be operated by customers, registering products by reading codes on products and supplying corresponding product data to said processing unit, wherein said processing unit processes the product data received from the second input units or read from the first input unit, separately for each of the second input units and for each transaction, based on the corresponding product data for each of the products registered by the corresponding second input unit, and supplies the processed product data to the corresponding second input unit, wherein each of the input units and the processing unit includes a rear side, and wherein the rear sides of the second input units and the rear side of the processing unit are adjoined directly, so that a customer operating one of the second input units and the store clerk operating said processing unit are facing each other across the processing unit and the second input unit.

2. A point-of-sales system as set forth in claim 1, wherein the product data supplied by said plurality of second input units includes barcode data which corresponds to one of the products;

the processed product data supplied by the processing unit includes price data which corresponds to one of the products; and each of the second input units comprises:

read means for reading barcode data recorded on each selected product in a transaction, input unit storage means for storing price data received from the processing unit, for each of the barcode data read in the transaction, and input communication means for transmitting the product data to the processing unit and for receiving data from the processing unit.

3. A point-of-sales system as set forth in claim 2, wherein each of the second input units comprises first input means for inputting a completion signal indicative of the completion of the transaction;

the product data supplied by the second input units includes an identification code identifying the corresponding second input unit; and the product data supplied by the second input units includes the stored price data, for all the products selected during the transaction.

4. A point-of-sales system as set forth in claim 3, wherein:

the processing unit comprises:

processing unit first storage means for storing the price data, for all products, in correspondence with the barcode data corresponding to the product;

operation means for receiving the price data, from the processing unit first storage means, for each selected product of a transaction of the corresponding second input unit, and for calculating a total price for the transaction, based on the read barcode data and the price data; and response means for receiving product data from the second input unit and transmitting the processed product data to the corresponding second input unit; and wherein the processing unit reads the corresponding price data of the selected product, corresponding to the barcode data received from the second input unit, from the processing unit first storage means, transmits the corresponding price data of the product to the corresponding second input unit, and transmits a total price, as calculated by the operation means, to the corresponding second input unit.

5. A point-of-sales system as set forth in claim 2, wherein:

the processing unit comprises:

processing unit first storage means for storing the price data, for all products, in correspondence with the barcode data corresponding to the product;

operation means for receiving the price data, from the processing unit first storage means, for each selected product of a transaction of the corresponding second input unit, and for calculating a total price for the transaction, based on the read barcode data and the price data; and response means for receiving product data from one of the second input units and transmitting the processed product data to the corresponding second input unit; and wherein the processing unit reads the corresponding price data of the selected product, corresponding to the barcode data received from the second input unit, from the processing unit first storage means, transmits the corresponding price data of the product to the corresponding second input unit, and transmits a total price, as calculated by the operation means, to the corresponding second input unit.

6. A point-of-sales system comprising:

a processing unit, including a first input unit to be operated by a store clerk, for registering products by reading bar codes on products, and processing means for processing product data; and a plurality of second input units, connected to said processing unit and to be operated by a customer, registering selected products by reading bar codes on products, and supplying corresponding data to said processing unit, the processing unit processing the received product data separately for each of the second input units and for each transaction, based on the product data for each of the products registered by the corresponding second input unit, and supplies the processed product data to the corresponding second input unit, the processing unit comprising:

processing unit first storage means for storing price data for all products in correspondence with bar code data on the product;

operation means for receiving the price data from the processing unit first storage means, for each selected product of a transaction, and for calculating a total price for the transaction, based on the read bar code data and the price data; and response means for receiving product data separately from the second input units, and transmitting the processed product data to the corresponding second input unit, wherein the processing unit reads the price data of the related product, corresponding to the bar code data received either from the first input unit or one of the second input units, from the processing unit first storage means, transmits the price data of the product to the corresponding second input unit, and transmits a total price, as calculated by the operation means, to the corresponding second input unit, and wherein a rear side of the second input units and a rear side of the processing unit adjoin so that a customer operating one of the second input units and the store clerk operating the processing unit are facing each other across the input unit and the processing unit.

7. A point-of-sales system as set forth in claim 6, wherein the processing unit comprises:

identification means for identifying the second input unit which has transmitted product data, by an identity code attached to the product data received from the second input unit.

8. A point-of-sales system as set forth in claim 6, wherein:

the product data supplied by the second input unit includes barcode data which corresponds to one of the products;

the processed product data supplied by the processing unit includes price data which corresponds to one of the products;

each of the second input units comprises:
 read means for reading barcode data recorded on each selected product in a transaction,
 first input unit means for inputting a completion signal indicative of the completion of the transaction when the barcode data has been read for each of the selected products, and
 input communication means for transmitting the product data to the processing unit and for receiving data from the processing unit; and the input unit receives a corresponding calculated total price from the processing unit in response to the transmission of the completion signal, indicating completion of the transaction, by the corresponding second input unit.

9. A point-of-sales unit as set forth in claim 8, wherein:

the product data supplied by the second input unit includes barcode data which corresponds to one of the products;

the processed product data supplied by the processing unit includes price data which corresponds to one of the products;

the processing unit comprises:
 processing unit first storage means for storing price data, for all products, in correspondence with the barcode data corresponding to the product;
 processing unit second storage means for providing a plurality of storage domains, each storage domain corresponding to one of the second input units, and for storing, in a corresponding storage domain, the corresponding price data, read from the processing unit first storage means, for each of the selected products of the transaction of the corresponding second input unit,
 operation means for receiving all the corresponding price data for the transaction of the corresponding second input unit, from the processing unit first storage means, and for calculating a total price for the transaction, based on the barcode data and the corresponding price data, and
 response means for receiving product data from the second input unit and transmitting the processed product data to the corresponding second input unit; and the processing unit stores the corresponding price data of the product corresponding to the barcode data received from the second input unit, and transmits the price data corresponding to the selected product to the corresponding second input unit, and reads the price data of the product from the corresponding storage domain when the processing unit receives a completion signal indicative of completion of the transaction and transmits the total price calculated by the operation means, to the corresponding second input unit.

10. A point-of-sales system as set forth in claim 6, wherein the processing unit comprises first information means for informing the store clerk of the end of the reading by the corresponding input unit, in accordance with a signal indicating the end of the reading of the recorded data which is transmitted from the input unit.

11. A point-of-sales system as set forth in claim 6, wherein each of the input units comprises a second input means for generating a fault signal, indicating that the read means is faulty.

12. A point-of-sales system as set forth in claim 6, wherein the processing unit comprises second information means for informing the operator that a fault of one of the corresponding input units has occurred, in response to a corresponding fault signal, supplied by the corresponding input unit.

13. A point-of-sales system comprising:

a processing unit operated by a store clerk; and a plurality of second input units, connected to said processing unit and operated by a customer, registering product data by using a first code reader, and supplying registered product data to said processing unit, wherein the processing unit comprises:
 a second code reader to be operated by the store clerk;
 processing unit first storage means for storing price data products in correspondence with the product data;
  processing unit second storage means for storing the price data read from the processing unit first storage means, corresponding to the products registered from one of the input units and the second code reader,
  operation means for receiving the price data from the processing unit first storage means in correspondence with the product data received from one of the input units, and for calculating a price for a transaction by a corresponding input unit; and
  response means for receiving registered product data separately from each of the input units, and transmitting the processed product data to the corresponding input unit;
 wherein the operation means reads the price data corresponding to one of the input units when the processing unit receives a completion signal indicative of completion of a transaction from the corresponding input unit, and transmits the total price calculated by the operation means to the corresponding input unit.

14. A point-of-sales system according to claim 13, wherein said processing unit comprises information means for informing the operator of the processing unit that a fault in one of the input units has occurred, in response to a corresponding fault signal supplied by one of the input units.

15. A point-of-sales system comprising:

a processing unit operated by a store clerk, including a first input unit registering products by reading codes on products, and a processor processing corresponding product data; and a plurality of second input units, connected to said processing unit and to be operated by customers, registering products by reading codes on products and supplying corresponding product data to said processing unit, said processing unit processing the product data received from the second input unit or read from the first input unit, separately for each of the second input units and for each transaction, based on the corresponding product data for each of the products registered by the corresponding second input unit, and supplying the processed product data to the corresponding second input unit.

* * * * *